US009296342B1

(12) United States Patent
Famojuro

(10) Patent No.: US 9,296,342 B1
(45) Date of Patent: Mar. 29, 2016

(54) AUTOMOBILE AIR VENT ATTACHABLE BEVERAGE HOLDING APPARATUS

(71) Applicant: Stephan Adeniji Famojuro, Missouri City, TX (US)

(72) Inventor: Stephan Adeniji Famojuro, Missouri City, TX (US)

( * ) Notice: Subject to any disclaimer, the term of this patent is extended or adjusted under 35 U.S.C. 154(b) by 0 days.

(21) Appl. No.: 14/507,750

(22) Filed: Oct. 6, 2014

Related U.S. Application Data

(60) Provisional application No. 61/900,944, filed on Nov. 6, 2013.

(51) Int. Cl.
| | |
|---|---|
| *B60N 3/10* | (2006.01) |
| *B60R 11/00* | (2006.01) |
| *B60R 7/06* | (2006.01) |
| *B60R 7/08* | (2006.01) |

(52) U.S. Cl.
CPC ... *B60R 7/08* (2013.01); *B60R 7/06* (2013.01); *B60N 3/103* (2013.01); *B60N 3/104* (2013.01); *B60R 2011/0008* (2013.01); *B60R 2011/0059* (2013.01); *B60R 2011/0071* (2013.01); *Y10S 224/926* (2013.01)

(58) Field of Classification Search
CPC .......... B60N 3/10; B60N 3/104; B60N 3/103; B62B 2202/023; B60R 2011/0008; Y10S 224/926
USPC .................. 224/483, 556, 560, 570, 571, 926
See application file for complete search history.

(56) References Cited

U.S. PATENT DOCUMENTS

| | | | | | |
|---|---|---|---|---|---|
| 4,779,831 | A | * | 10/1988 | Anderson | 248/311.2 |
| 4,801,060 | A | * | 1/1989 | Thompson | 224/275 |
| 4,852,843 | A | * | 8/1989 | Chandler | 248/311.2 |
| 4,856,744 | A | * | 8/1989 | Frankel | 248/215 |
| 4,951,910 | A | * | 8/1990 | March | 248/311.2 |
| 5,092,395 | A | * | 3/1992 | Amidzich | 165/41 |
| 5,244,175 | A | * | 9/1993 | Frankel | 248/215 |
| D356,161 | S | * | 3/1995 | Peterson | D24/199 |
| 5,400,990 | A | * | 3/1995 | Frankel | 248/215 |
| 5,489,055 | A | * | 2/1996 | Levy | 224/544 |
| 5,810,228 | A | * | 9/1998 | Brokering | 224/414 |
| 5,839,710 | A | * | 11/1998 | Hubbard | 248/311.2 |
| 5,979,724 | A | * | 11/1999 | Loewenthal et al. | 224/483 |
| 6,029,874 | A | * | 2/2000 | Meggitt | 224/412 |
| 6,264,153 | B1 | * | 7/2001 | Ragner et al. | 248/311.2 |
| 6,441,872 | B1 | * | 8/2002 | Ho | 348/837 |
| 6,533,232 | B1 | * | 3/2003 | Aggeler | 248/311.2 |
| 6,560,983 | B1 | * | 5/2003 | Schimmeyer | 62/244 |
| 6,648,290 | B1 | * | 11/2003 | Aleman | 248/311.2 |
| 6,708,992 | B1 | * | 3/2004 | Vargas | 280/47.38 |
| 6,722,540 | B2 | * | 4/2004 | Ling | 224/275 |
| 6,932,255 | B2 | * | 8/2005 | Van Houtte | 224/414 |
| 7,533,860 | B2 | * | 5/2009 | Somuah | 248/311.2 |
| D612,691 | S | * | 3/2010 | Barnes, Jr. | D7/620 |
| 7,712,718 | B2 | * | 5/2010 | Schimmeyer | 248/311.2 |

(Continued)

*Primary Examiner* — Justin Larson
(74) *Attorney, Agent, or Firm* — Williams Intellectual Property; Benjamin F. Williams

(57) ABSTRACT

An automobile air vent attachable beverage holding apparatus including a sleeve member disposed to gird at least a portion of a beverage container and supportively position said beverage container conjunct an airflow proximal an air vent interior to an automobile when at least one mounting insert is detachably secured to position the sleeve member thereat, whereby heat exchange between the beverage container and the airflow is facilitated and an associated beverage is maintainable within desired and palatable temperatures while heating or alternately cooling an automobile is concurrently effected.

10 Claims, 3 Drawing Sheets

(56) References Cited

U.S. PATENT DOCUMENTS

| | | | |
|---|---|---|---|
| 7,766,294 B2 * | 8/2010 | Schimmeyer | 248/311.2 |
| 8,096,517 B1 * | 1/2012 | Hamilton | 248/308 |
| 8,322,584 B2 * | 12/2012 | Dethmers | 224/544 |
| 8,740,167 B1 * | 6/2014 | Collins | 248/311.2 |
| 8,757,573 B1 * | 6/2014 | Barnes, Jr. | 248/311.2 |
| 2002/0179282 A1 * | 12/2002 | Kutzner | 165/41 |
| 2004/0129852 A1 * | 7/2004 | Giampavolo | 248/315 |
| 2004/0182897 A1 * | 9/2004 | Andrews et al. | 224/274 |
| 2007/0241152 A1 * | 10/2007 | Josephs | 224/483 |
| 2008/0178623 A1 * | 7/2008 | Cunningham | 62/244 |
| 2014/0034697 A1 * | 2/2014 | Mak et al. | 224/483 |
| 2014/0364051 A1 * | 12/2014 | Iglesias Soto | 454/330 |

* cited by examiner

AUTOMOBILE AIR VENT ATTACHABLE BEVERAGE HOLDING APPARATUS

CROSS-REFERENCE TO RELATED APPLICATIONS

This nonprovisional application claims the benefit of provisional application No. 61/900,944 filed on Nov. 6, 2013.

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of automobile beverage holding apparatuses are known in the prior art. However, what is needed is an automobile air vent attachable beverage holding apparatus devised to be portable and readily attachable and selectively detachable to an extant air vent in an automobile, as desired, wherein extant beverage containers are securable conjunct any airflow producible at said air vent when the automobile's heating or cooling system is activated whereby air conditioning and heating systems extant in an automobile may be used concurrently to maintain a particular beverage at a desired and palatable temperature.

FIELD OF THE INVENTION

The present invention relates to an automobile air vent attachable beverage holding apparatuses, and more particularly, to an automobile air vent attachable beverage holding apparatus devised to be portable and readily attachable and selectively detachable to an extant air vent in an automobile, as desired, wherein extant beverage containers are securable conjunct any airflow producible at said air vent when the automobile's heating or cooling system is activated whereby air conditioning and heating systems extant in an automobile may be used concurrently to maintain a particular beverage at a desired and palatable temperature.

The present automobile air vent attachable beverage holding apparatus, therefore, includes a sleeve member disposed to gird at least a portion of a beverage container and supportively position said beverage container conjunct an airflow proximal an air vent interior to an automobile when at least one mounting insert is detachably secured to position the sleeve member thereat, whereby heat exchange between the beverage container and the airflow is encouraged and the associated beverage is maintainable within desired and palatable temperatures.

SUMMARY OF THE INVENTION

The general purpose of the automobile air vent attachable beverage holding apparatus, described subsequently in greater detail, is to provide an automobile air vent attachable beverage holding apparatus which has many novel features that result in an automobile air vent attachable beverage holding apparatus which is not anticipated, rendered obvious, suggested, or even implied by prior art, either alone or in combination thereof.

The present automobile air vent attachable beverage holding apparatus has been devised to enable securable attachment of a beverage container proximal an automobile air vent, whereby heat exchange is encouraged between said beverage container and an airflow producible when said automobile's heating or cooling system is activated.

The present automobile air vent attachable beverage holding apparatus, therefore, includes a sleeve member securable to gird at least a portion of a beverage container and supportively maintain said beverage container in position proximal an air vent in an automobile interior, as will be described subsequently. The sleeve member is preferentially rendered of a thermally conductive material, such as aluminum or steel, whereby heat is readily conductible through said sleeve member.

The sleeve member is detachably securable to an automobile air vent by means of at least one mounting insert. The at least one mounting insert is configured for releasable attachment to an automobile air vent to position the sleeve member proximal thereto, whereby a beverage container engaged in the sleeve member is oriented conjunct an airflow producible at the automobile air vent. Heat exchange between the beverage container and said airflow is thereby engendered, whereby heating and alternately cooling of a beverage is enabled concurrent heating and cooling an automobile interior.

In an example embodiment herein disclosed, the at least one mounting member includes a pair of mounting members radially disposed upon the sleeve member. Each mounting insert is insertible into the automobile air vent for hooking engagement therein whereby the sleeve member is detachably securable to the air vent. A beverage container disposed interior to the sleeve member is thereby disposed in a horizontal plane and is thus positioned for maximum surface area contact conjunct an airflow producible at the air vent when the automobile's heating and alternately cooling system is activated.

To further maximize heat exchange between the beverage container and the airflow producible at the automobile air vent, at least one aperture is disposed in the sleeve member. The at least one aperture is rendered in the sleeve member in a position to increase direct contact of the airflow produced at the associated air vent with the surface of the beverage container, whereby heat exchange between the beverage container and the airflow is encouraged.

In an example embodiment herein disclosed, each of the pair of mounting inserts includes an elastomeric sheath member disposed to cover a distal edge of each of said pair of mounting inserts. The elastomeric sheath member is disposed to increase frictional contact between the air vent and each mounting insert and to provide a yielding point of contact therebetween, whereby damage to the air vent from action of attachment and detachment of the sleeve member is preventable.

A user may, therefore, install the instant automobile air vent attachable beverage holding apparatus in position proximal an air vent interior to an automobile and thereby enable heat exchange between a beverage and any airflow producible at the particular air vent, whereby said user may enjoy a beverage at a desired palatable temperature while traveling.

Thus has been broadly outlined the more important features of the present automobile air vent attachable beverage holding apparatus so that the detailed description thereof that follows may be better understood and in order that the present contribution to the art may be better appreciated.

Objects of the present automobile air vent attachable beverage holding apparatus, along with various novel features that characterize the invention are particularly pointed out in the claims forming a part of this disclosure. For better understanding of the automobile air vent attachable beverage holding apparatus, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
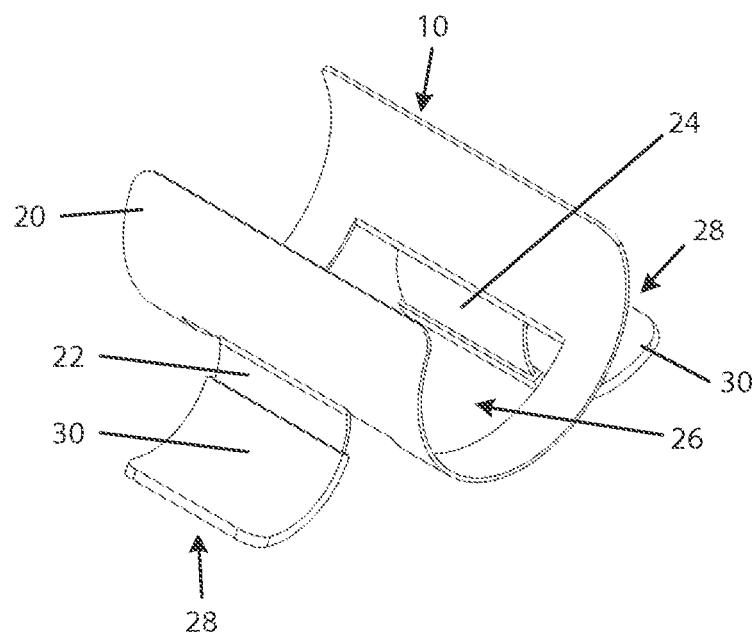
FIG. 1 is an isometric view of an embodiment.
Figure 2:
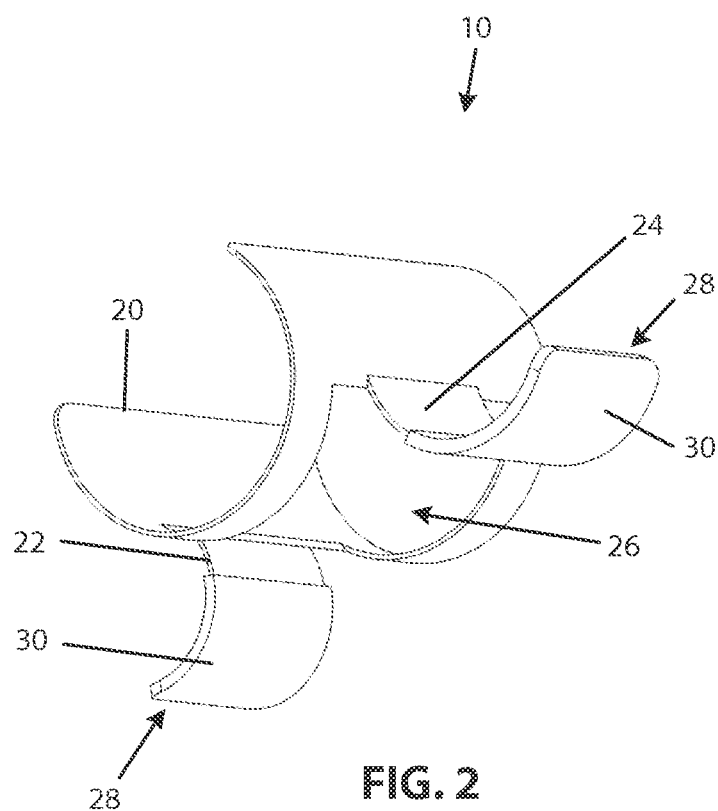
FIG. 2 is an isometric view of an embodiment.
Figure 3:
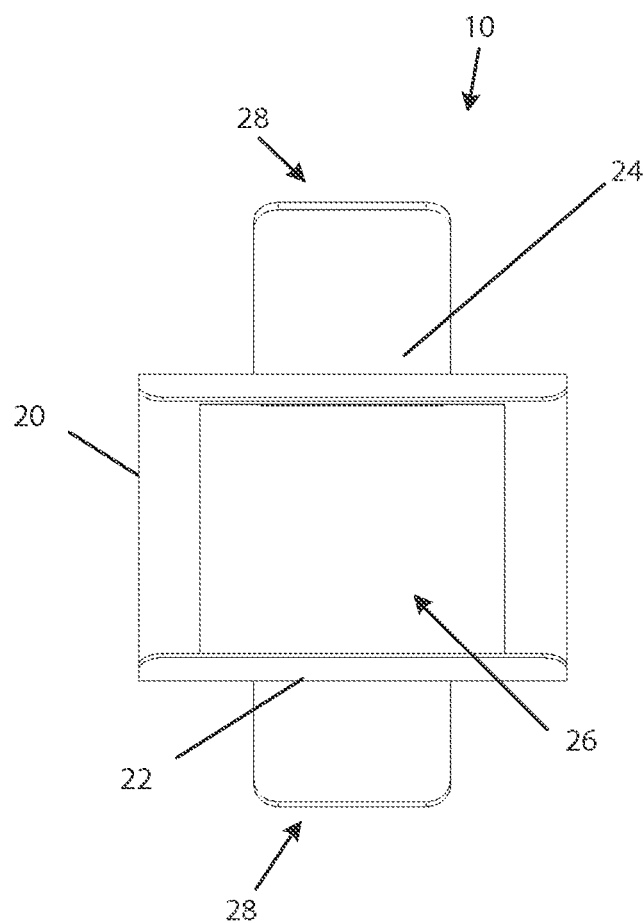
FIG. 3 is a top view of an embodiment.

With reference now to the drawings, and in particular FIGS. 1 through 3 thereof, example of the instant automobile air vent attachable beverage holding apparatus employing the principles and concepts of the present automobile air vent attachable beverage holding apparatus and generally designated by the reference number 10 will be described.

Referring to FIGS. 1 through 3 a preferred embodiment of the present automobile air vent attachable beverage holding apparatus 10 is illustrated.

The present automobile air vent attachable beverage holding apparatus 10 has been devised to enable securable positioning of a beverage container conjunct an airflow producible at an air vent interior to an automobile, whereby concurrent heating or cooling of a beverage is enabled additional to heating and cooling said automobile interior.

The present automobile air vent attachable beverage holding apparatus 10 is devised to be portable and readily attachable and selectively detachable to an extant air vent in an automobile, as desired, whereby extant beverage containers are securable conjunct any airflow producible at said air vent when the automobile's heating or cooling system is activated. Thus, the air conditioning and heating systems extant in an automobile may be used concurrently to maintain a particular beverage at a desired and palatable temperature.

The automobile air vent attachable beverage holding apparatus 10, therefore includes a thermally conductive semi-cylindrical sleeve member 20 engageable around a beverage container. The term "semi-cylindrical", as used throughout this specification, is intended to define an arced planar structure comprising a portion of the surface area of a cylinder. It is not intended by this disclosure to limit embodiments of the invention 10 to a sleeve member 20 having the surface area corresponding to the surface area of exactly half a relative cylinder. Neither is the presence or absence of a base of a cylinder intended or implied. Where embodiments of the invention 10 enable a base, such a base may be practiced within the metes and bounds of the intended scope of this invention 10, as set forth herein.

However, as is evident from the drawings accompanying this disclosure, a preferred embodiment of the instant automobile air vent attachable beverage holding apparatus 10 is devised absent any base of a cylinder, whereby the general size of a beverage container dispositional interior to the sleeve member is not restricted by said beverage container's length.

In the preferred embodiment illustrated by FIGS. 1 through 3, the sleeve member 20 is engageable to gird at least a portion of a beverage container, whereby the beverage container is releasably securable and supportable interior to the sleeve member 20. The sleeve member 20 may engage and gird a beverage container by tensile action of the sleeve member 20 thereabouts or by sliding engagement of the beverage container into said sleeve member 20. The sleeve member 20 thus secures around at least a portion of a beverage container to position said beverage container proximal an air vent conjunct an airflow producible at said air vent, as will be subsequently described.

At least one mounting insert 22 is included attached to the sleeve member 20. The at least one mounting insert 22 is devised to detachably secure the sleeve member 20 proximal an air vent in an automobile and support a beverage container conjunct an airflow producible thereat when the automobile heating or cooling system is activated, or when the air vents are otherwise opened.

In the preferred embodiment set forth herein, the at least one mounting insert 22 includes an alar pair of mounting inserts 22, 24 disposed upon the sleeve member 20, each of said pair of mounting inserts 22, 24 radially disposed on either side of a longitudinal tangential axis of the sleeve member 20. Each of said pair of mounting inserts 22, 24 is disposed equidistant said longitudinal tangential axis of said sleeve member 20 and is curved in a common direction relative the curvature of the semi-cylindrical sleeve member 20. Each of the pair of mounting inserts 22, 24 is thereby insertible into an automobile air vent for hooking engagement therein to supportively maintain a beverage container disposed in the sleeve member 20 proximal said air vent conjunct an airflow producible thereat.

At least one aperture 26 is disposed in the semi-cylindrical sleeve member 20. The at least one aperture 26 is provided to increase conductivity of heat between the beverage container and an airflow producible at the automobile air vent whereat the present automobile air vent attachable beverage holding apparatus 10 is installed. In the preferred embodiment herein disclosed, the at least one aperture 26 is disposed between each of the pair of mounting inserts 22, 24 and a beverage container disposed in the sleeve member 20 is positional whereby an airflow producible at the particular automobile air vent is directable through the at least one aperture 26 to directly contact the surface of the beverage container and conduct heat between said beverage container and said airflow.

In the preferred embodiment set forth herein, a distal edge 28 is disposed upon each of the pair of mounting inserts 22, 24. The distal edge 28 is disposed lengthwise in a plane parallel a longitudinal axis of the sleeve member 20. An elastomeric sheath member 30 is disposed upon each of the pair of mounting inserts 22, 24, said elastomeric sheath member 30 disposed to overlie the distal edge 28 of each of the pair of mounting members 22, 24 whereby damage rendered by contact effected between the air vent and the mounting members 22, 24 is preventable. Furthermore, each elastomeric sheath member 30 frictionally engages each mounting insert 22, 24 against the air vent whereby unintentional displacement of the apparatus 10 from the air vent is also preventable.

Thus each of the pair of mounting inserts 22, 24 is insertible into an automobile air vent to position and detachably secure said sleeve member 20 proximal an air vent interior to an automobile, and a beverage container disposed in the sleeve member 20 is thereby securable in position conjunct an airflow producible at the air vent, whereby heat is conductible between the airflow and the beverage additional to heating and alternatively cooling an automobile.

What is claimed is:

1. An automobile air vent attachable beverage holding apparatus comprising a sleeve member engageable around a beverage container, said sleeve member having a pair of mounting inserts attachable into an automobile air vent, wherein each of said mounting inserts is disposed radially on either side of a longitudinal tangential axis of the sleeve member, equidistant said longitudinal tangential axis, and curved in a single direction relative to the curvature of the sleeve member about an axis parallel to said longitudinal tangential axis, and wherein heat is conductive into and alternatively away from a beverage additional to heating or cooling an automobile.

2. The automobile air vent attachable beverage holding apparatus of claim 1 wherein at least one aperture is disposed in the sleeve member whereby any airflow producible at the automobile air vent is directable through said at least one aperture when the sleeve member is attached to said automobile air vent.

3. The automobile air vent attachable beverage holding apparatus of claim 1 wherein each of the pair of mounting inserts includes a distal edge disposed lengthwise along a plane parallel a longitudinal tangent of the sleeve member.

4. The automobile air vent attachable beverage holding apparatus of claim 3 further comprising an elastomeric sheath member covering the distal edge of each of the pair of mounting inserts, said elastomeric sheath disposed to engage each of said mounting inserts into an automobile air vent and releasably secure the sleeve member conjunct an airflow producible at said air vent.

5. The automobile air vent attachable beverage holding apparatus of claim 4 wherein the sleeve member is comprised of a thermally conductive material whereby heat is readily conducted through said sleeve member.

6. The automobile air vent attachable beverage holding apparatus of claim 5 wherein the sleeve member is comprised of aluminum.

7. The automobile air vent attachable beverage holding apparatus of claim 5 wherein the sleeve member is comprised of steel.

8. An automobile air vent attachable beverage holding apparatus comprising:

a thermally conductive semi-cylindrical sleeve member engageable around at least a portion of a beverage container;

an alar pair of mounting inserts disposed upon the sleeve member, each of said pair of mounting inserts radially disposed on either side of a longitudinal tangential axis of the sleeve member, each of said pair of mounting inserts equidistant said longitudinal tangential axis of said sleeve member and curved in a single direction relative the curvature of the semi-cylindrical sleeve member about an axis parallel to said longitudinal tangential axis;

a distal edge disposed upon each of the pair of mounting inserts, said distal edge disposed lengthwise in a plane parallel a longitudinal axis of the sleeve member;

at least one aperture disposed in the semi-cylindrical sleeve member between each of the pair of mounting inserts; and an elastomeric sheath member disposed upon each of the pair of mounting inserts, said elastomeric sheath member disposed to overlie the distal edge of each of the pair of mounting members;

wherein each of the pair of mounting inserts is insertible into an automobile air vent to position and detachably secure said sleeve member proximal an air vent interior to an automobile, and a beverage container disposed in the sleeve member is thereby securable in position conjunct an airflow producible at the air vent, whereby heat is conductible between the airflow and the beverage container additional to heating and alternatively cooling an automobile.

9. The automobile air vent attachable beverage holding apparatus of claim 8 wherein the sleeve member is comprised of aluminum.

10. The automobile air vent attachable beverage holding apparatus of claim 8 wherein the sleeve member is comprised of steel.

* * * * *